United States Patent
Bacon-Brown et al.

(10) Patent No.: US 12,116,810 B2
(45) Date of Patent: Oct. 15, 2024

(54) ROTATION PREVENTION LOCKING DEVICE

(71) Applicant: dormakaba USA Inc., Indianapolis, IN (US)

(72) Inventors: James David Bacon-Brown, Lexington, KY (US); Adam Dunnigan, Lexington, KY (US)

(73) Assignee: dormakaba USA Inc., Indianapolis, IN (US)

( * ) Notice: Subject to any disclaimer, the term of this patent is extended or adjusted under 35 U.S.C. 154(b) by 1132 days.

(21) Appl. No.: 16/926,068

(22) Filed: Jul. 10, 2020

(65) Prior Publication Data
US 2022/0010917 A1     Jan. 13, 2022

(51) Int. Cl.
  *F16M 11/04*     (2006.01)
  *E05B 9/08*     (2006.01)
  *F16M 13/02*     (2006.01)

(52) U.S. Cl.
  CPC ..................................... *E05B 9/08* (2013.01)

(58) Field of Classification Search
  CPC ............... E05B 9/08; E05B 2047/0057; E05B 2047/0058; E05B 49/00; E05B 65/0075; E05B 15/00; E05B 65/52; Y02E 60/10
  See application file for complete search history.

(56) References Cited

U.S. PATENT DOCUMENTS

| 8,172,284 | B2* | 5/2012 | Chern | E05B 3/06 |
|---|---|---|---|---|
| | | | | 292/336.3 |
| 2010/0253100 | A1 | 10/2010 | Chern | |
| 2014/0345336 | A1* | 11/2014 | Fawcett | E05B 73/0011 |
| | | | | 70/58 |
| 2016/0345447 | A1* | 11/2016 | Kraz | G08B 17/113 |

(Continued)

FOREIGN PATENT DOCUMENTS

| DE | 401571 C | 9/1924 |
|---|---|---|
| GB | 2309732 A | 8/1997 |

OTHER PUBLICATIONS

European Patent Office, Communication, Extended European Search Report issued for European Patent Application No. 21184041.8, dated Nov. 29, 2021, 4 pages.

*Primary Examiner* — Kristina R Fulton
*Assistant Examiner* — Thomas L Neubauer
(74) *Attorney, Agent, or Firm* — Norton Rose Fulbright US LLP

(57) ABSTRACT

An attachment system for a locking device mounted to a closure comprises a baseplate fastenable to a mounting surface of the closure, a housing and an insert. The baseplate includes at least one circumferential track having an engagement feature, and a plurality of circumferential cutouts terminating with a catch portion. The housing includes a plurality of extrusions insertable into the at least one circumferential track and engageable with the engagement feature to prevent the housing from being withdrawn from (Continued)

the baseplate in a direction normal to the mounting surface. The housing further includes a slot. The insert is securely insertable into the slot. The insert includes a frame having a plurality of protrusions insertable into the circumferential cutouts in the baseplate. The protrusions are slideably lockable in the catch portions of the circumferential cutouts to prevent relative rotation between the baseplate and the housing.

10 Claims, 20 Drawing Sheets

(56) References Cited

U.S. PATENT DOCUMENTS

| | | |
|---|---|---|
| 2019/0211580 A1 | 7/2019 | Horiuchi |
| 2020/0190850 A1 | 6/2020 | Huang |
| 2021/0393870 A1* | 12/2021 | Kessel .............. A61M 5/14244 |

* cited by examiner

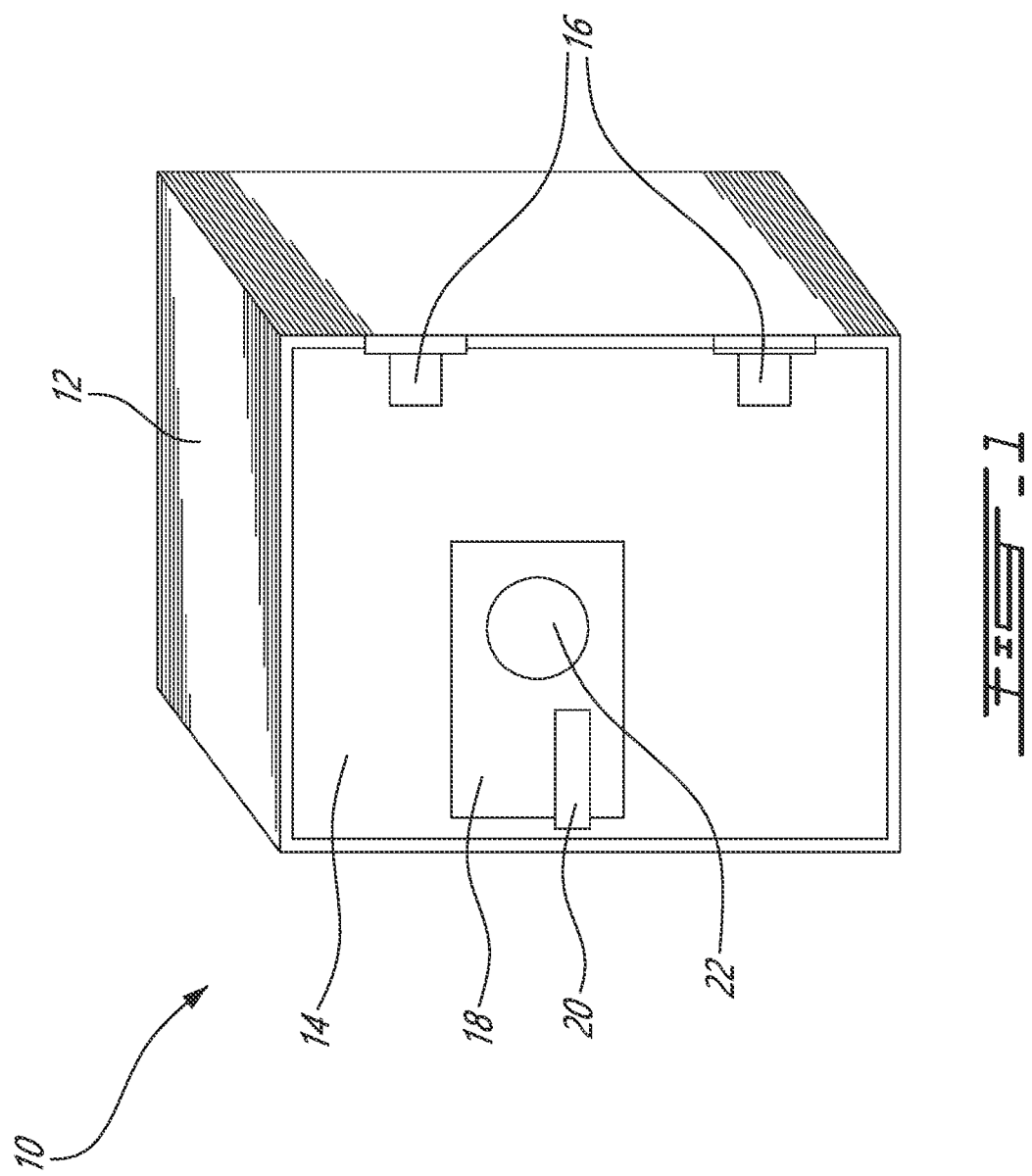

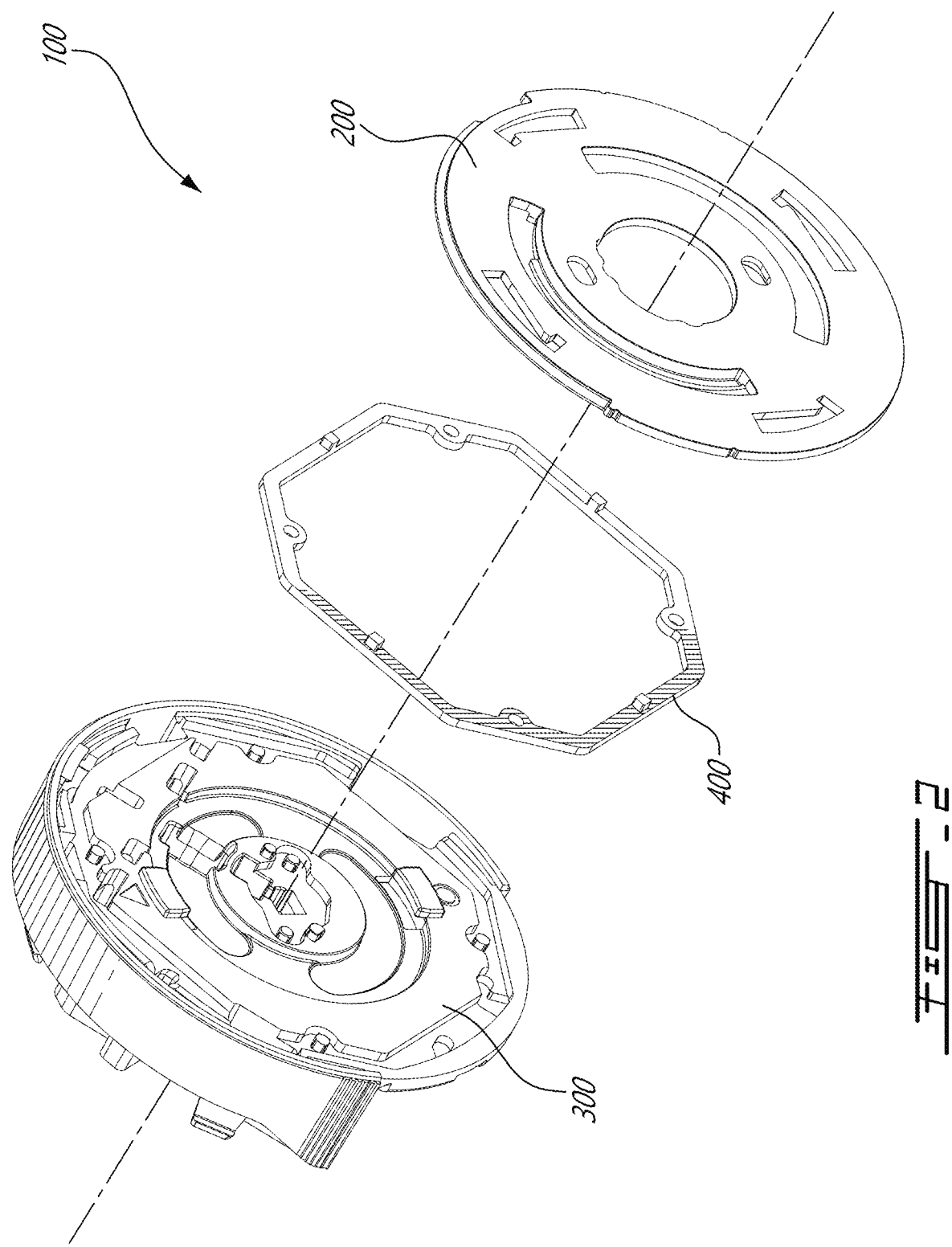

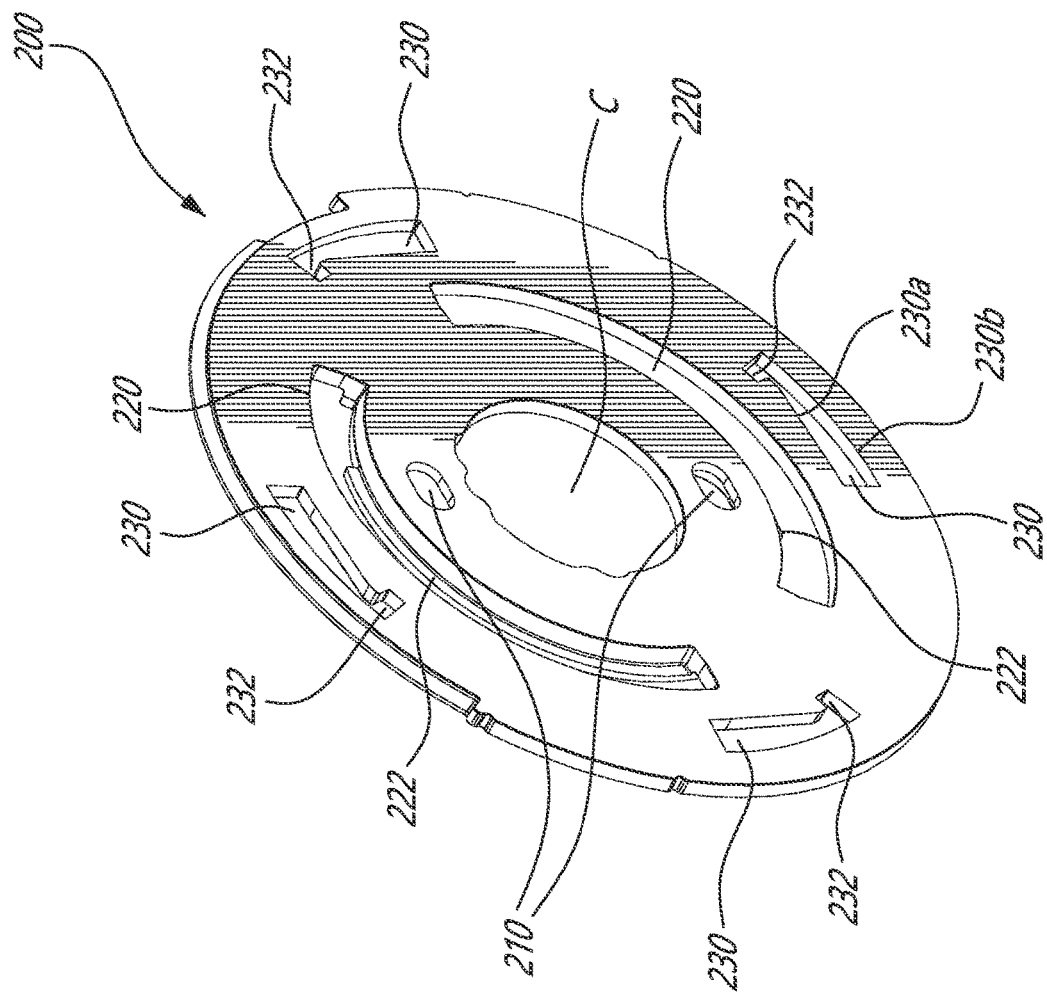

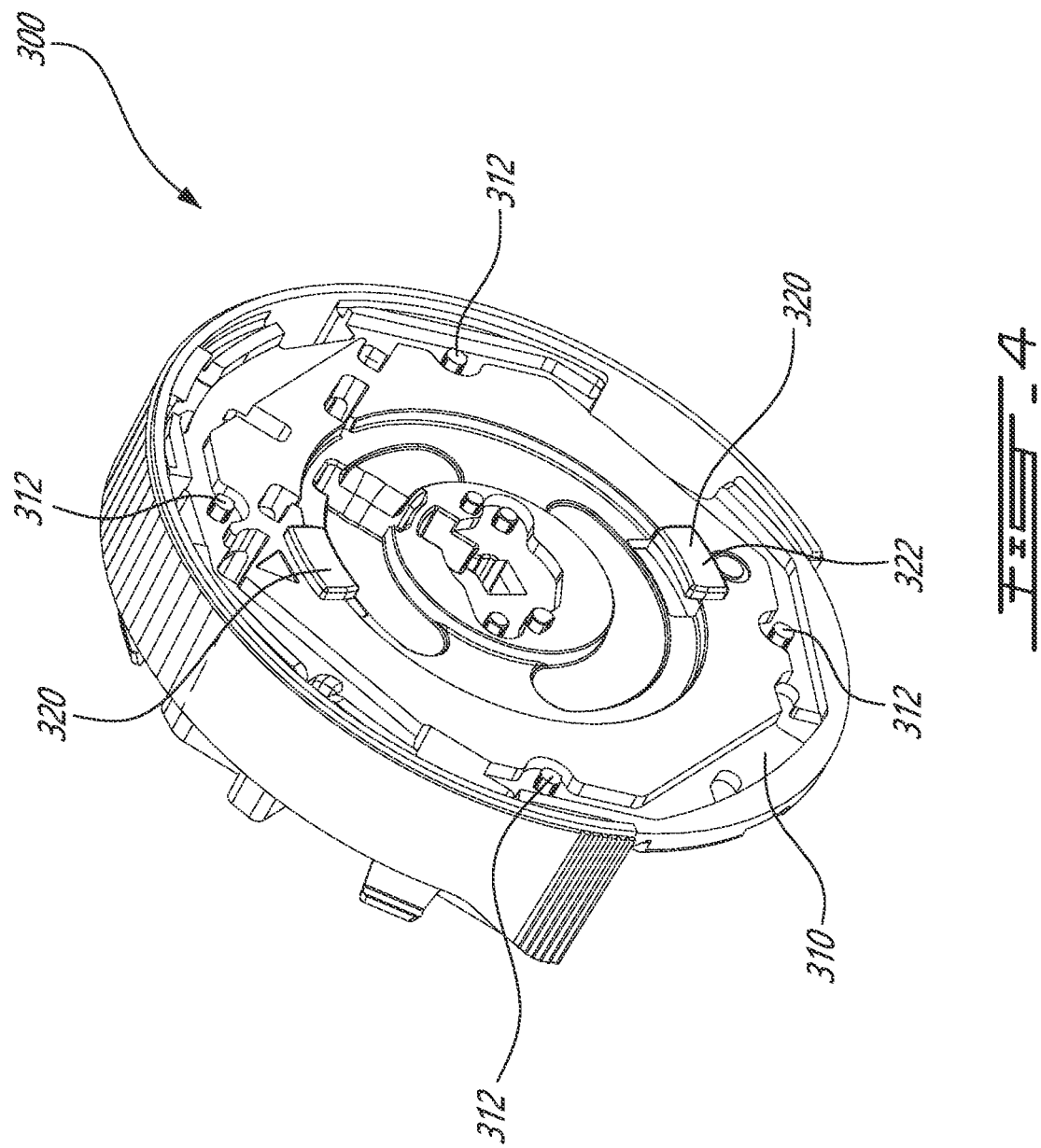

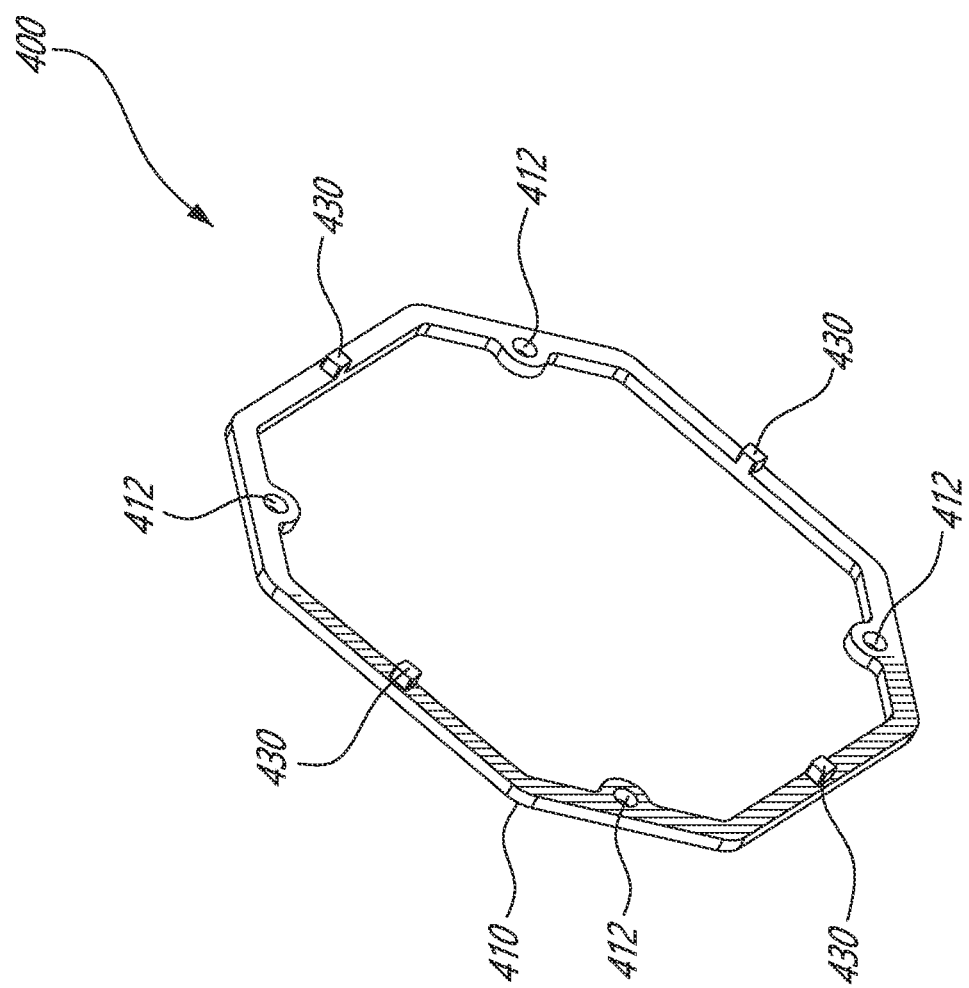

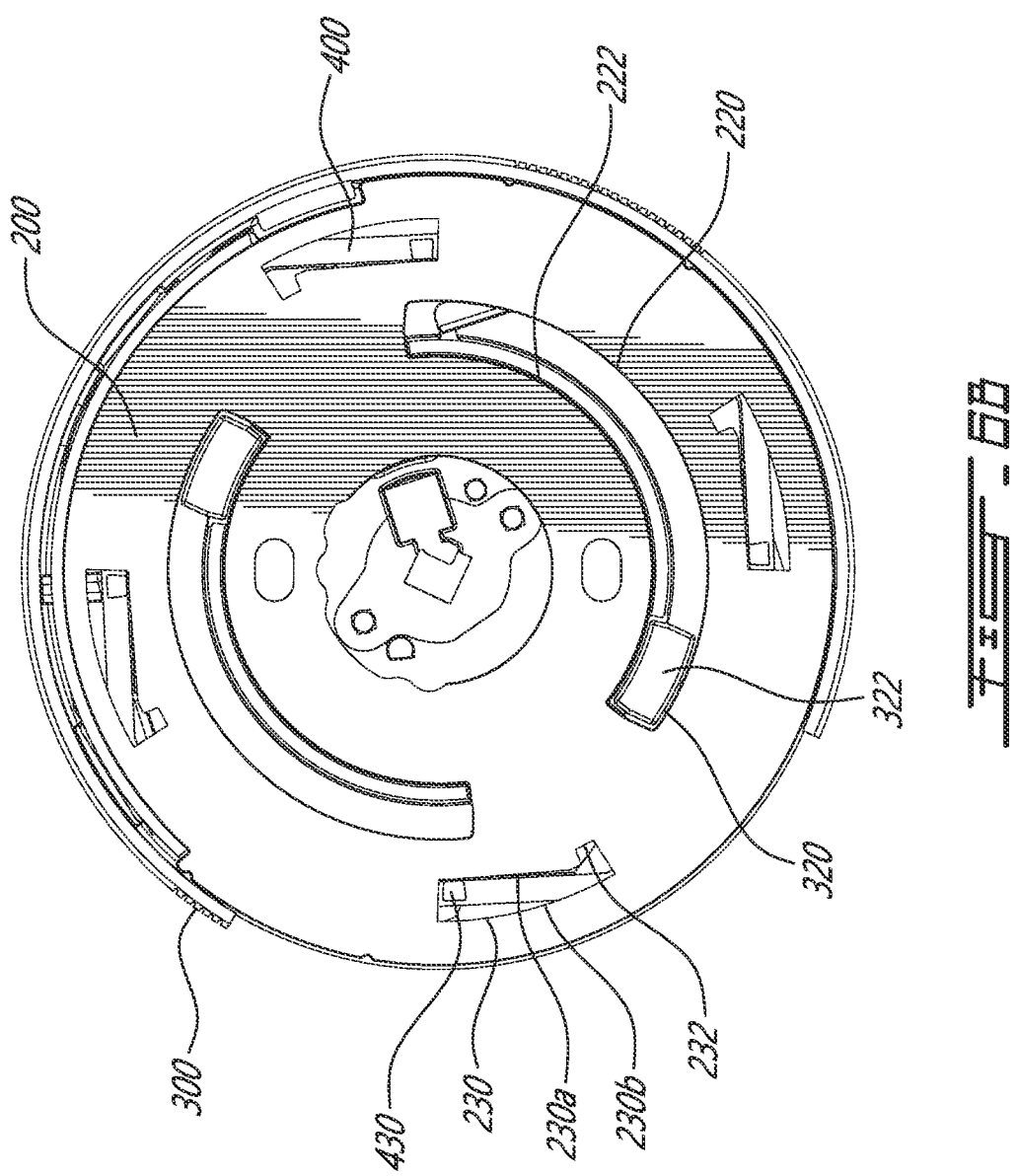

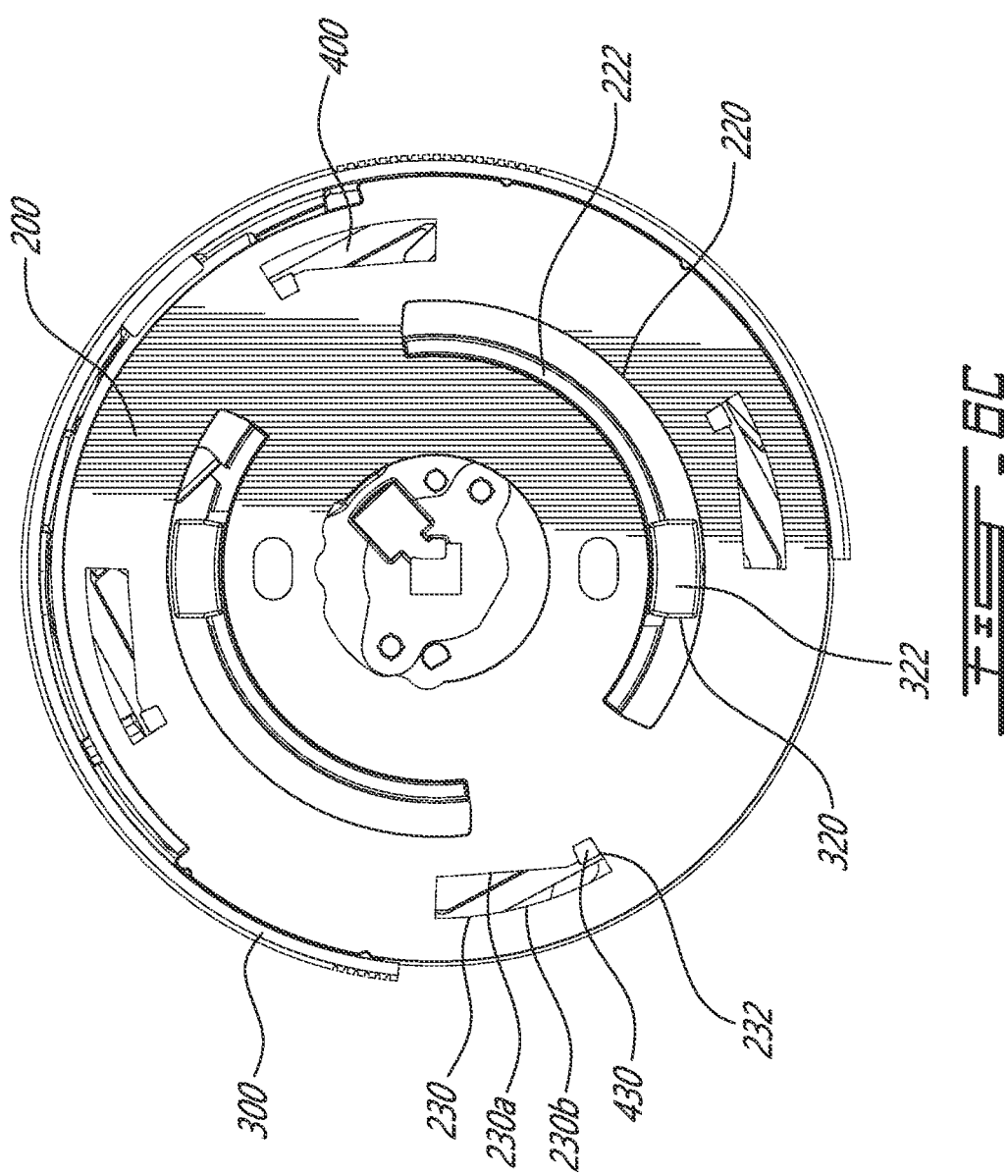

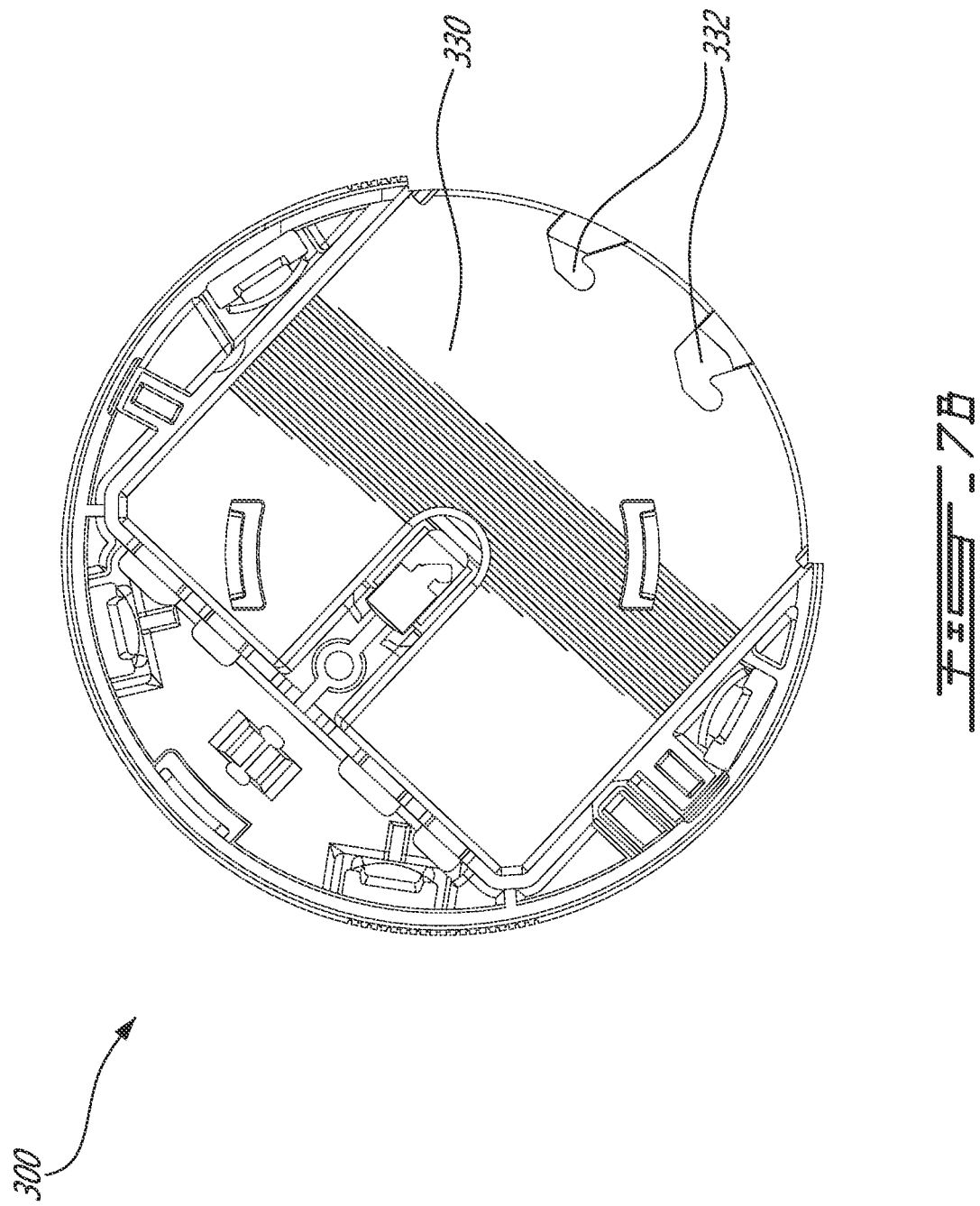

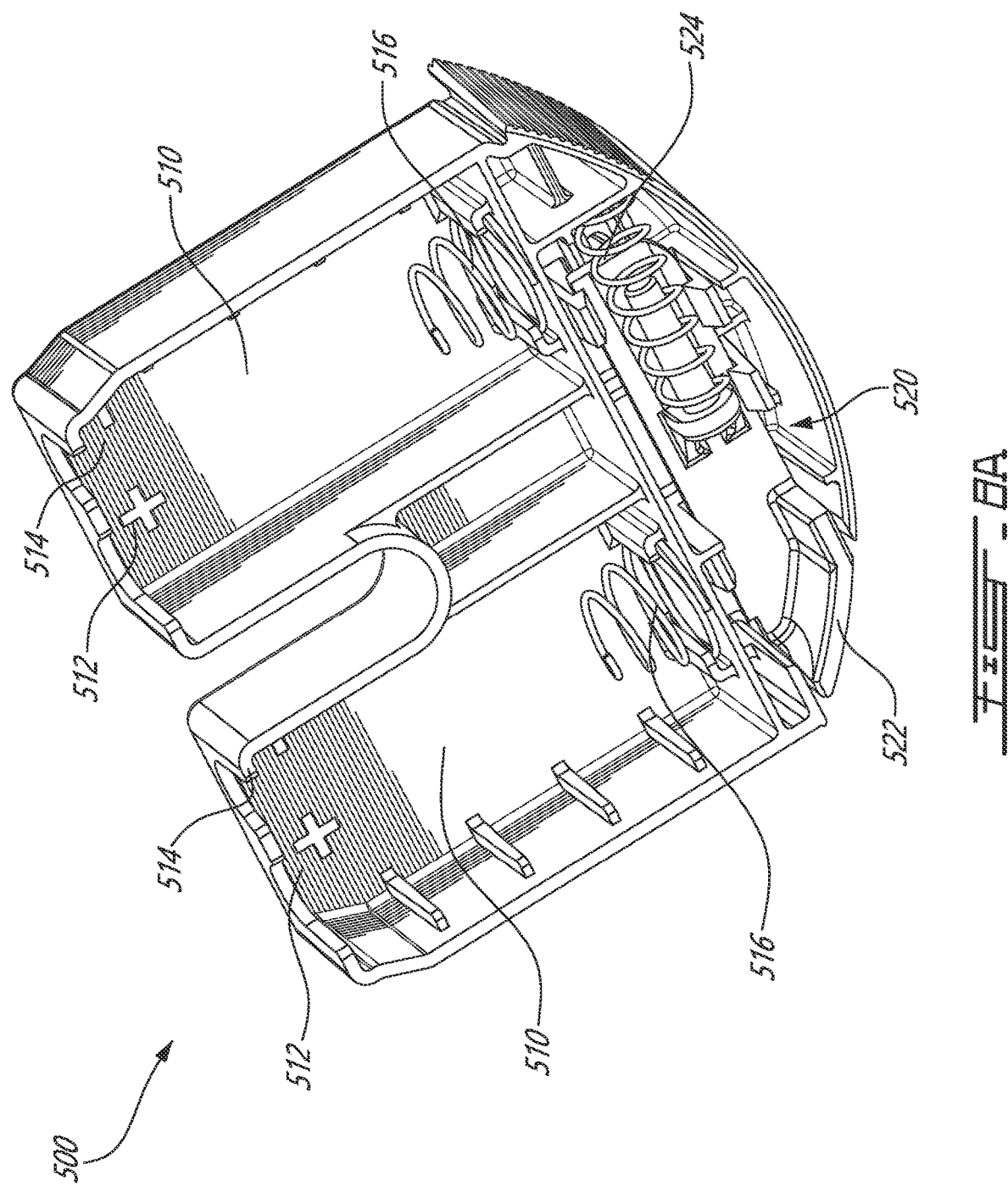

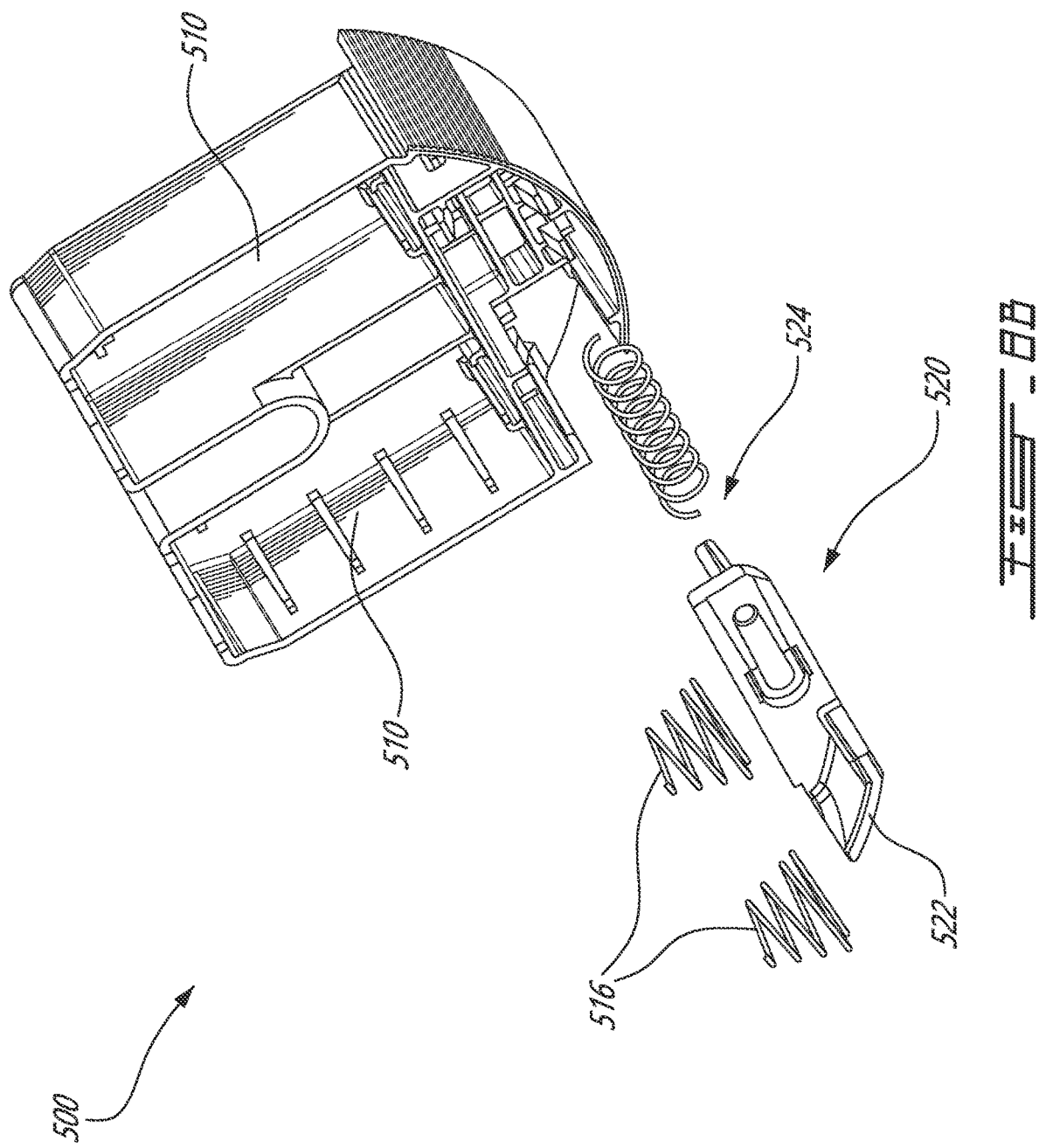

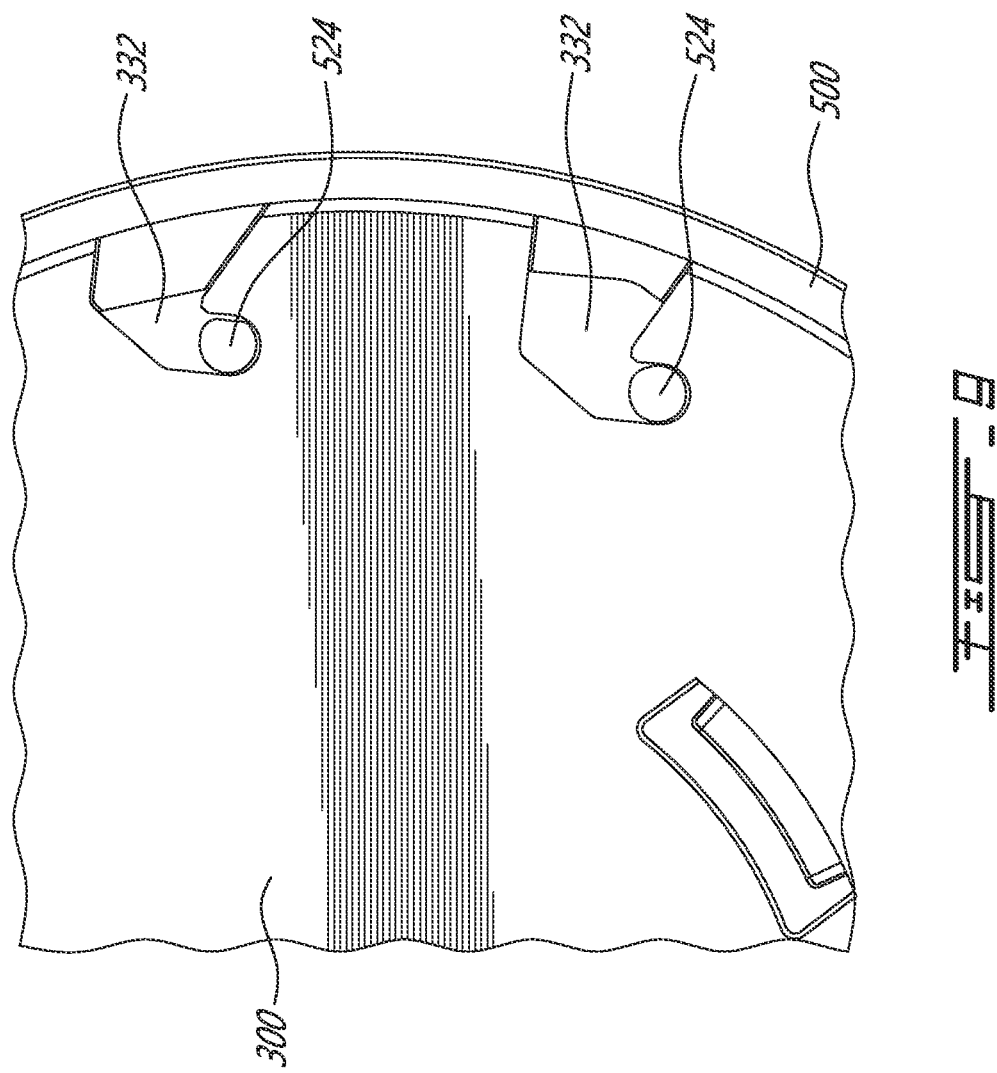

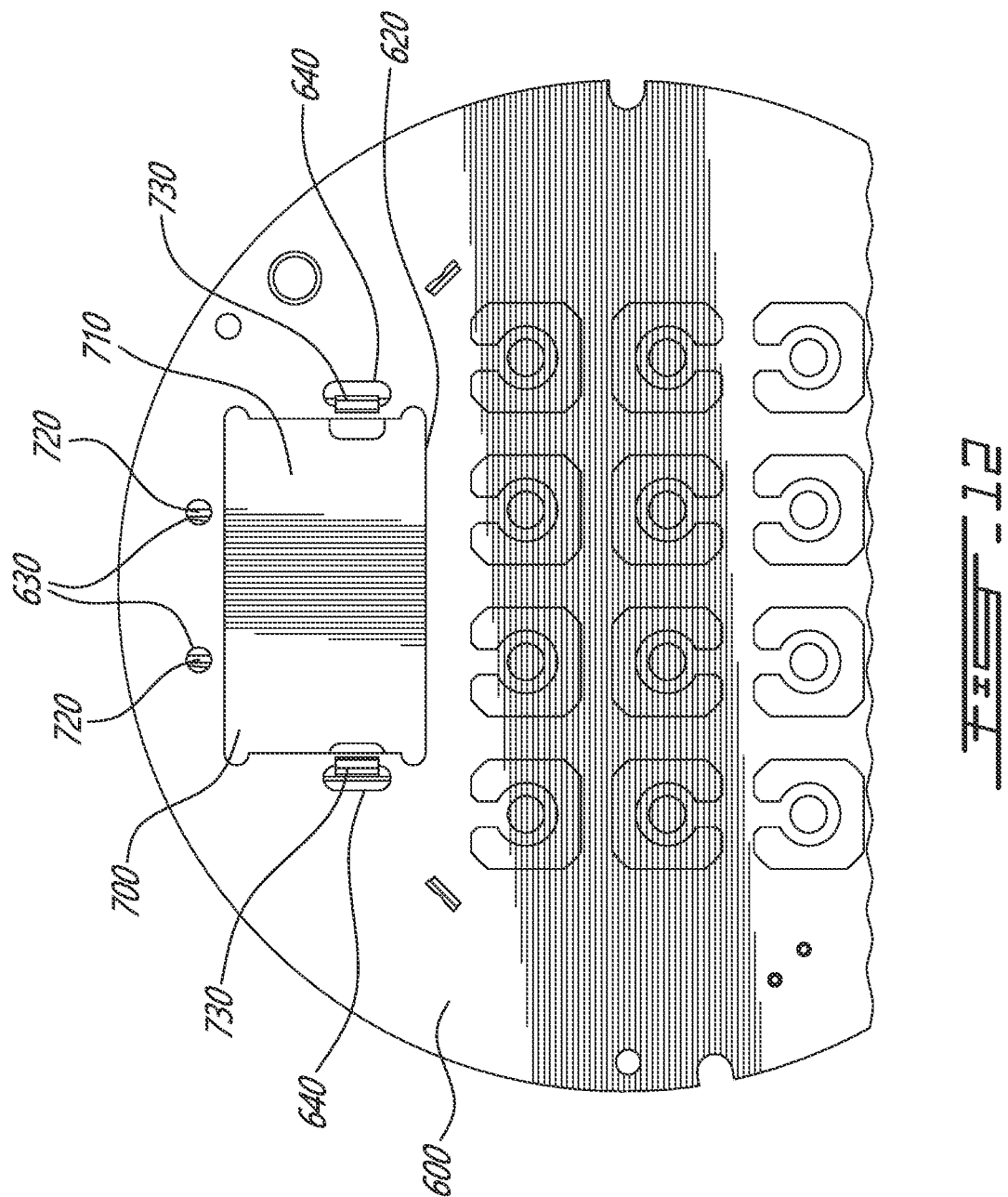

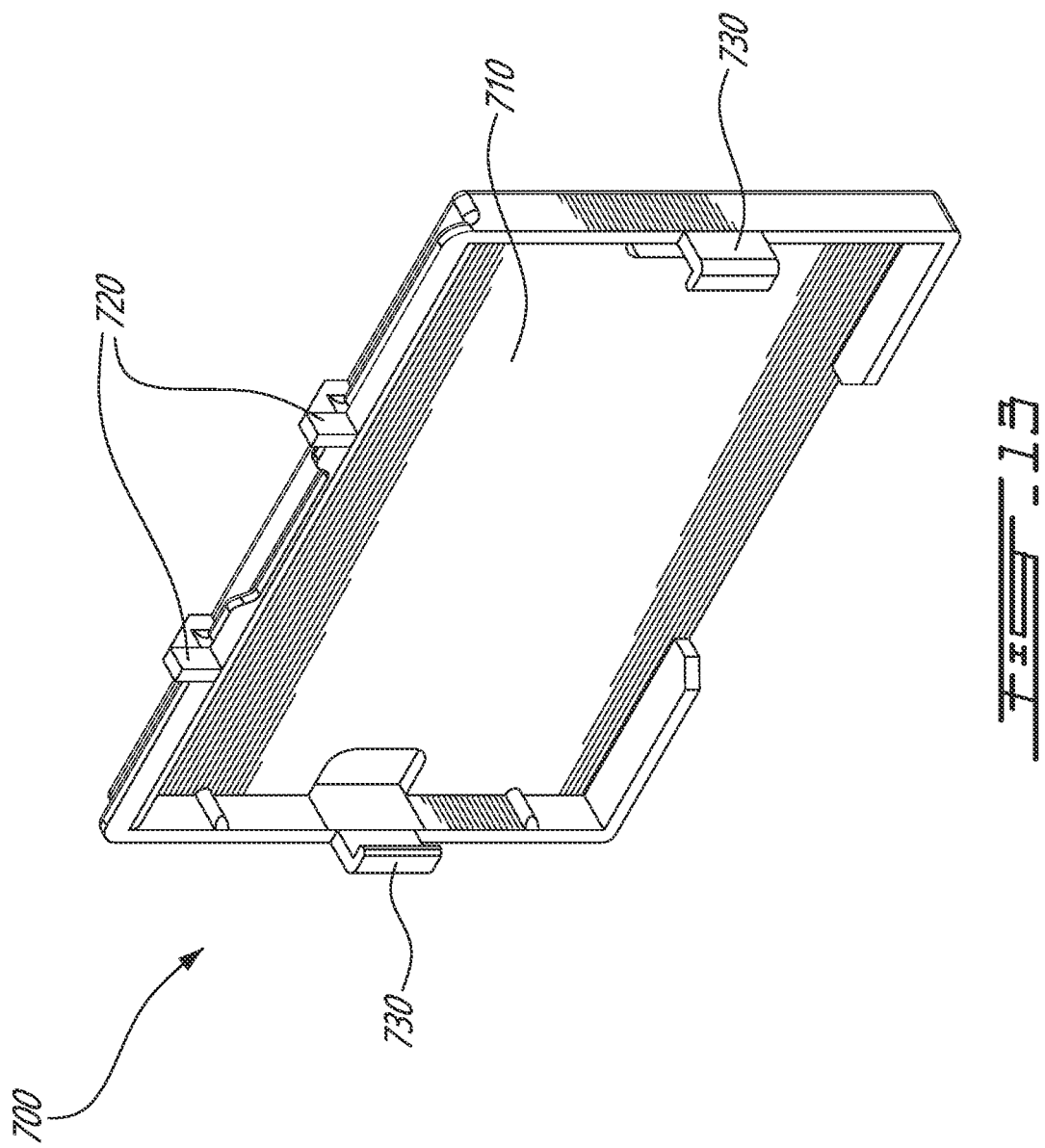

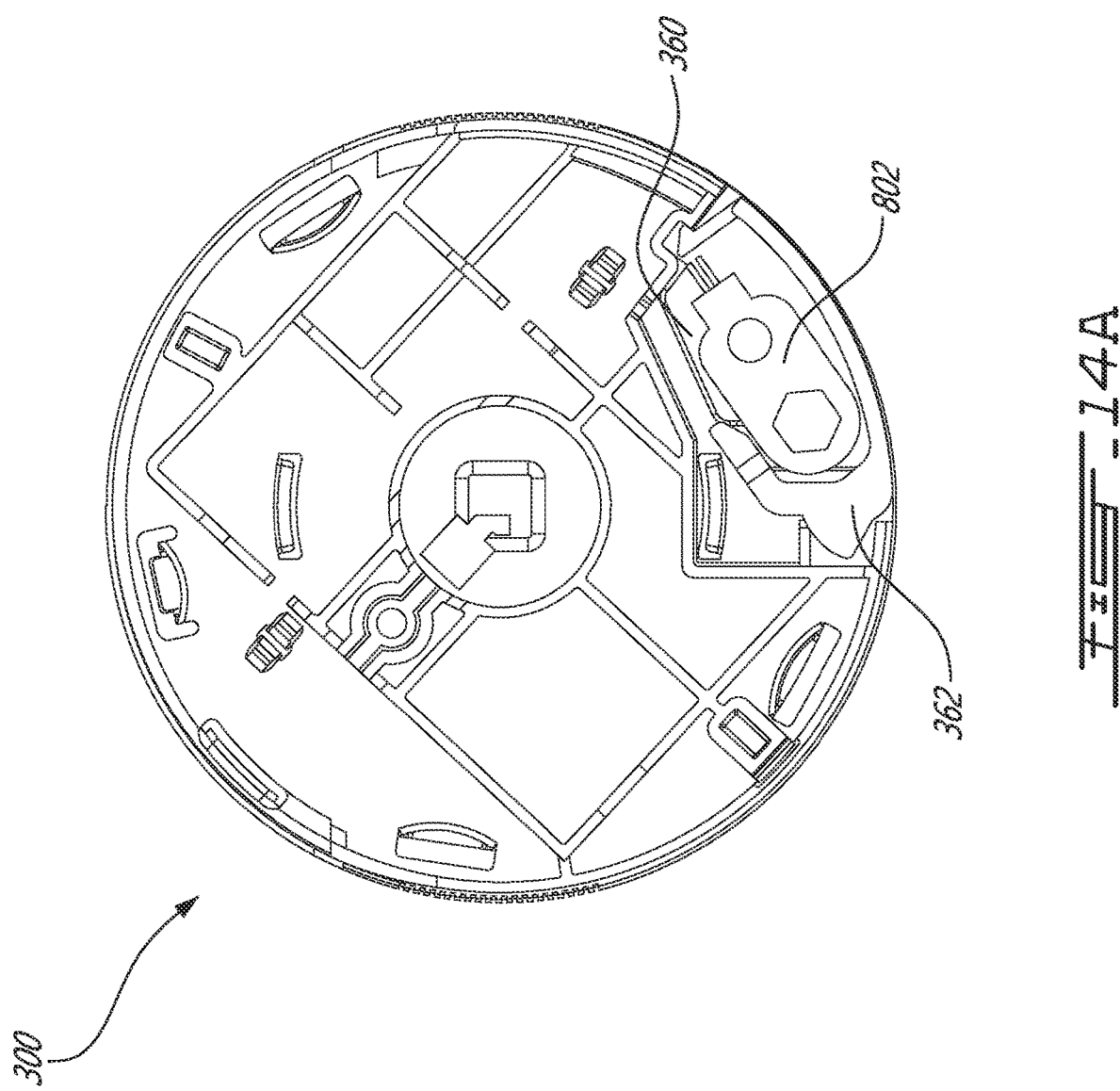

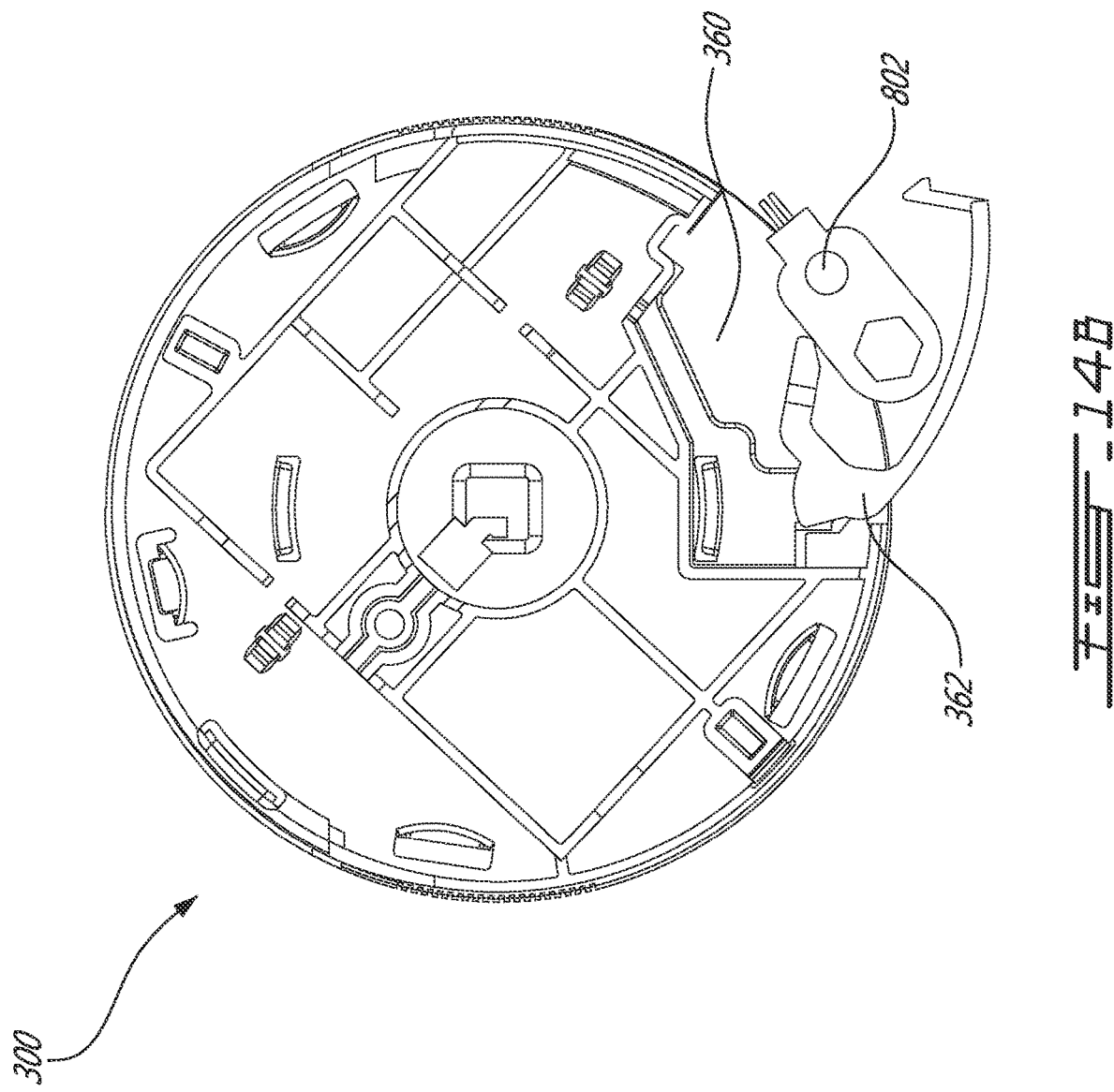

ROTATION PREVENTION LOCKING DEVICE

TECHNICAL FIELD

The present disclosure relates generally to the field of locking devices and more particularly to rotation prevention locking devices.

BACKGROUND

Rotating dials or components, for example in locking systems, often must be mounted to a surface and locked in place to prevent their rotation. Such systems often include a baseplate to be mounted to the surface, for example a lockable safe, and a housing unit that is attachable to the baseplate and may house various components. Typical such systems often utilize spring-loaded pins to prevent rotation between the baseplate and the attached housing unit. These spring-loaded pins may be loaded in the housing and fire and lock the housing in place when the housing rotates to a given point in a track in the baseplate. However, such spring-loaded pins often do not provide a tight fit between the housing and the baseplate due to the space they occupy, and their placement additionally often requires additional depth in the housing. In addition, the springs may often be lost or misplaced during the installation of the housing on the baseplate.

SUMMARY

In accordance with one aspect, there is provided an attachment system for a locking device mounted to a closure, the attachment system comprising a baseplate fastenable to a mounting surface of the closure, the baseplate including at least one circumferential track having an engagement feature, and a plurality of circumferential cutouts terminating with a catch portion, a housing including a plurality of extrusions insertable into the at least one circumferential track in the baseplate and engageable with the engagement feature to prevent the housing from being withdrawn from the baseplate in a direction normal to the mounting surface, the housing further including a slot, and an insert securely insertable into the slot in the housing, the insert including a frame having a plurality of protrusions insertable into the plurality of circumferential cutouts in the baseplate, wherein the plurality of protrusions are slideably lockable in the catch portions of the plurality of circumferential cutouts to prevent relative rotation between the baseplate and the housing.

In accordance with another aspect, there is provided an insert for preventing relative rotation between a housing attached to a baseplate of a locking device mounted to a closure, the insert comprising a frame having a plurality of protrusions, the frame securely receivable in a slot in the housing shaped to snugly receive the frame, the plurality of protrusions insertable into a plurality of circumferential cutouts terminating with a catch portion in the baseplate, wherein the plurality of protrusions are slideably lockable in the catch portions of the plurality of circumferential cutouts to prevent relative rotation between the baseplate and the housing.

In accordance with another aspect, there is provided a method for assembling an attachment system for a locking device, comprising inserting an insert into a housing, wherein the insert is received in a non-rotatable fashion in a mating seat defined in the housing, engaging a plurality of extrusions projecting from an inner surface of the housing with at least one circumferential slot of a baseplate to mount the housing to the baseplate, engaging a plurality of protrusions projecting from the insert into a plurality of circumferential cutouts terminating with a catch portion in the baseplate, and rotating the housing relative to the baseplate to slideably lock the plurality of protrusions in the catch portions of the plurality of circumferential cutouts.

Many further features and combinations thereof concerning the present improvements will appear to those skilled in the art following a reading of the instant disclosure.

DESCRIPTION OF THE DRAWINGS

FIG. 1 is a perspective view of a safe with an example locking system;

FIG. 2 is an exploded perspective view of an attachment system, in accordance with an embodiment of the present disclosure;

FIG. 3 is a perspective view of a base plate for the attachment system of FIG. 2;

FIG. 4 is a perspective view of a housing for the attachment system of FIG. 2;

FIG. 5 is a perspective view of an insert for the attachment system of FIG. 2;

FIG. 6A is a perspective view and FIGS. 6B and 6C are front views showing, in sequence, an exemplary assembly of the attachment system of FIG. 2;

FIGS. 7A and 7B are rear views of the housing of FIG. 4 with and without an inserted optional battery cassette, respectively;

FIGS. 8A and 8B are perspective and exploded perspective views of the optional battery cassette of FIG. 7A;

FIG. 9 is an enhanced view of the optional battery cassette compartment and battery cassette of FIG. 7A;

FIG. 12 is a top view of an optional printed circuit board mountable in the housing of FIG. 4;

FIG. 13 is a perspective view of a display frame attachable to the printed circuit board shown in FIG. 12;

FIGS. 14A and 14B are rear views of the housing of FIG. 4 with an optional power compartment shown in closed and partially open positions, respectively.

DETAILED DESCRIPTION

Figure 6A:
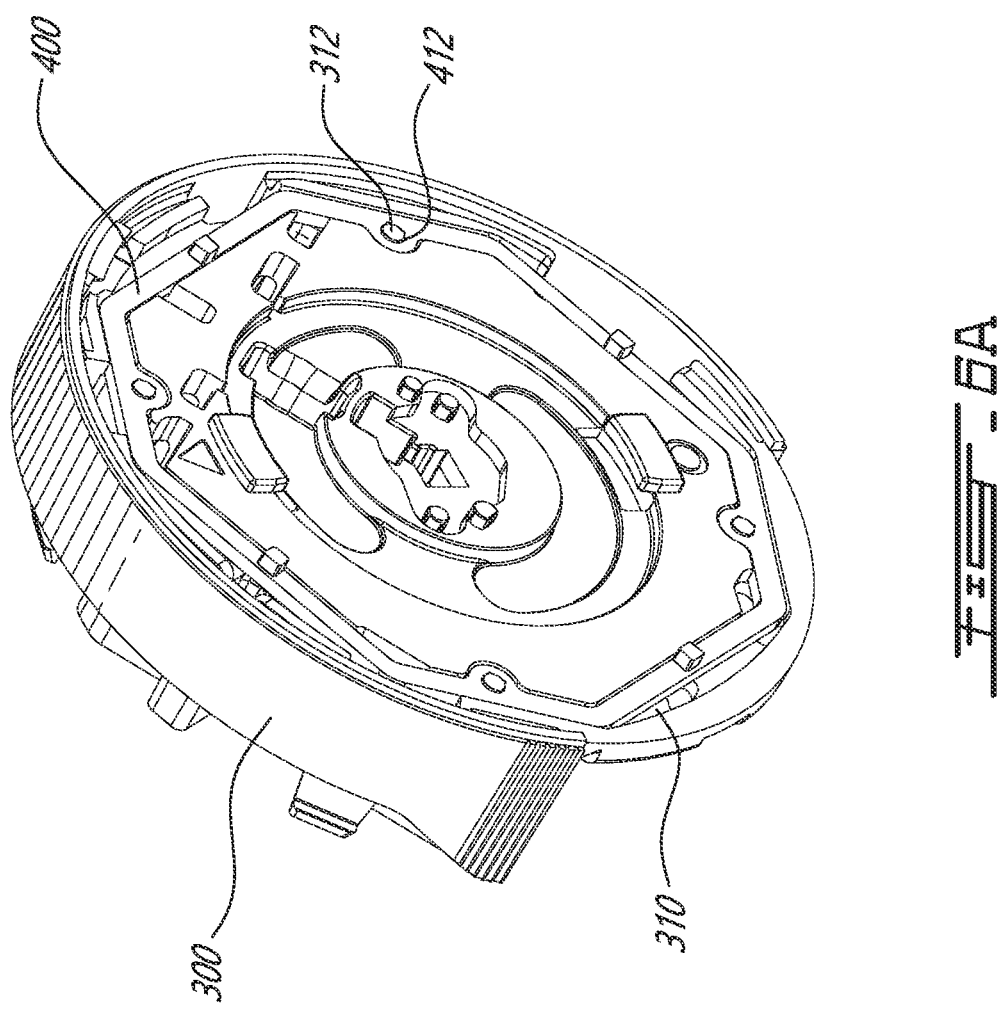
Figure 7A:
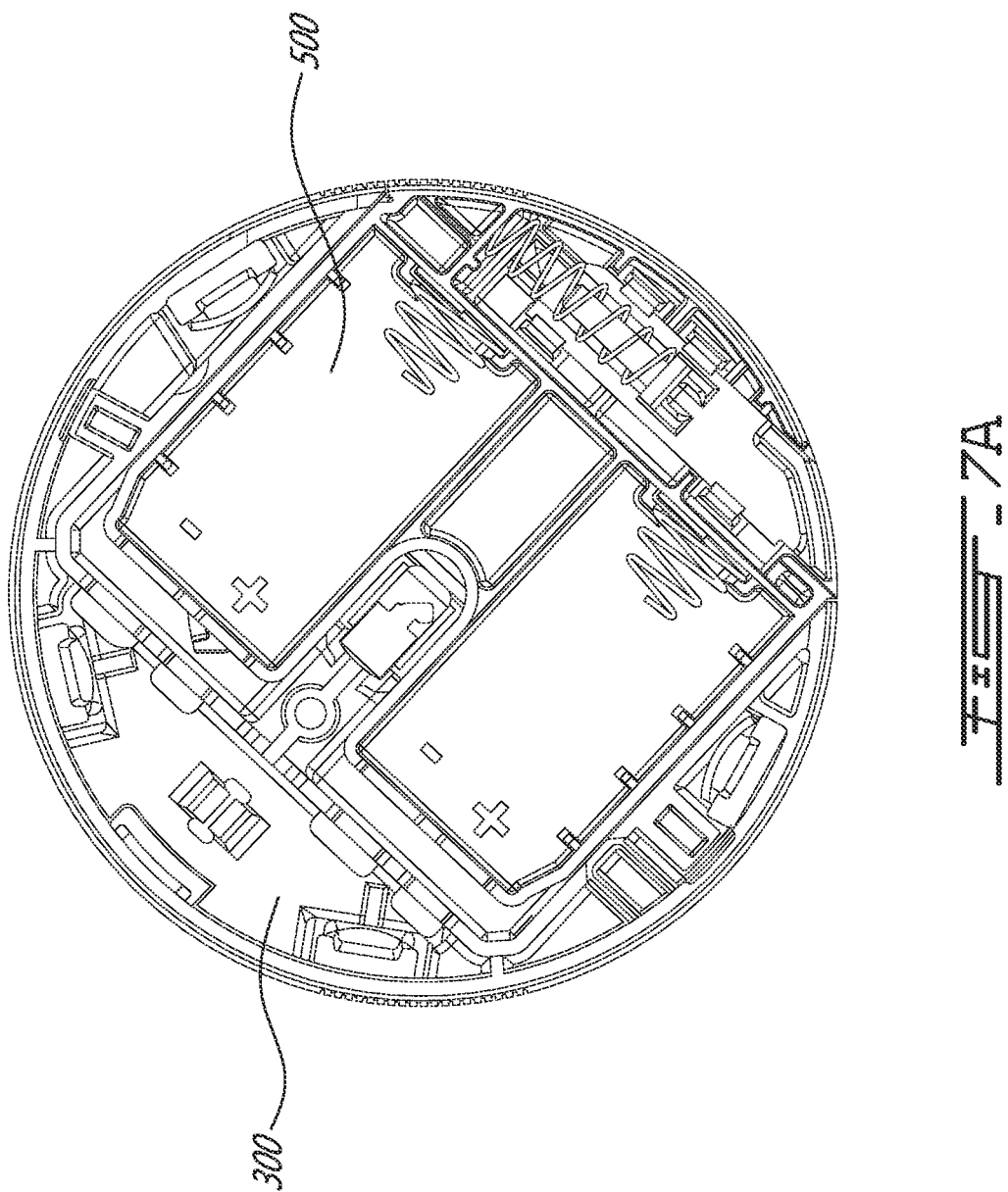

The present disclosure teaches various attachment systems and methods that can be applied, for example, to a locking system or device 10 as shown in FIG. 1. Locking system 10 may be adapted to a closure, such as a safe 12. The safe 12 may be used for personal or commercial use and may be kept in a residence, office, hotel, or other place of business in which items of value are to be safely stored. The safe 12 includes a door 14 that is openable and closable to either allow or prevent access to an inside volume of the safe 12. Illustratively, the door 14 is hingedly mounted to a front side edge of the safe 12 via a pair of hinges 16, although other mounting means and opening means may be considered as well. The door 14 includes a mounting plate 18 mountable to the door 14, for instance via screws or other fastening means. A door handle 20 and an entry device 22 are mountable to the mounting plate 18, as will be discussed in further detail below. In other cases, the door 14 may be adapted to receive the door handle 20 and entry device 22 directly on a surface thereon. The entry device 22 may provide a user with access to the inside volume of the safe 12, for example via a numerical combination code enterable on a keypad on a surface of the entry device 22. In various embodiments, the keypad may be a soft keypad or a foil keypad. Other keypads may be considered as well. Alternatively, the user may be provided with an electronic key, for example on a keycard or integrated into a mobile application which, when placed proximate to the entry device 22, triggers the unlocking of the locking system 10. The entry device 22 may be operatively connected to a locking means, for instance a deadbolt or a swingbolt, to lock or unlock the safe 12, while the door handle 20 may be operatively connected to a sprung latch for opening and closing the door 14. In various embodiments, the entry device 22 may be powered by one or more onboard batteries or by an auxiliary power supply. In some embodiments, the entry device 22 may include one or more lights and a speaker to alert the user of various events relating to a status of the locking system 10. Various components of the locking system 10 are rotatably mounted to the door 14, for instance the door handle 20 and a knob (not shown) on an inside surface of the door 14 configured to pull a locking bolt (not shown) away from an edge of the safe 12, while other components are non-rotatably mounted to the door. The entry device 22 is an example of a component of locking system 10 that requires securement to a mounting surface, in this case the mounting plate 18, to which the present disclosure applies. In some cases, such securement is to be in a non-rotatable fashion. However, other components may be considered for such attachment systems and methods as well. The locking system 10 taught by the present disclosure is not limited to the illustrated safe 12 shown in FIG. 1, as other sizes, shapes and styles of safes may implement such a locking system 10 as well. In addition, the present disclosure may be adapted to locking systems for other closures such as a door lock for a building, for instance a hotel room door.

Referring now to FIG. 2, an attachment system 100 is shown for mounting a component of a locking device, for example the entry device 22, to a mounting surface, for example the mounting plate 18 or directly on the door 14 of the safe 12, in a non-rotatable fashion. The attachment system 100 includes a baseplate 200, a housing 300, and an insert 400. As will be discussed in further detail below, the housing 300, which may house various components of the locking system 10, may be attached to the mounting surface via the baseplate 200, while the insert 400 prevents relative rotation between the baseplate 200 and the housing 300. FIG. 2 shows an exploded view of the attachment system 100 along an axis X. Various metals, plastics or other like materials may be used for the housing 300 and the insert 400, while the baseplate 200 may be made from various metals, composites of glass fiber and plastic, or other such strong materials given its load-supporting role.

Referring additionally to FIG. 3, the baseplate 200 is fastenable or attachable to a mounting surface, for example the mounting plate 18 or directly on the door 14. While the baseplate 200 is shown as being substantially circular, other shapes may be considered as well. In an embodiment, the baseplate 200 may include apertures 210, for example to pass through screws or other like fasteners to corresponding threaded openings in the mounting plate 18. Other attachment means may be considered as well to securely attach the baseplate 200 to the mounting surface and support the weight of the housing 300 and any components housed within. Baseplate 200 further includes one or more circumferential tracks 220 defined about a center point C thereof having engagement features 222 for joining the baseplate 200 to the housing 300, as will be discussed in further detail below. Illustratively, the baseplate 200 includes two circumferential tracks 220, each having a lip-like engagement feature 222 spanning a portion of its arc, as will be discussed in further detail below. In other embodiments, a single circumferential track 220 may span all or part of the circumference of the baseplate 200. The baseplate further includes a plurality of circumferential cutouts 230 defined about the center point C thereof, illustratively four circumferential cutouts 230, each terminating in a catch portion 232. In the shown embodiment, the circumferential cutouts 230 are tapered, as the thickness of each circumferential cutout 230 lessens from one end to another in the direction of the catch portion 232, where each circumferential cutout 230 abruptly changes direction from its circumferential arc. Illustratively, each catch portion 232 abruptly changes directions from the circumferential arc of the circumferential cutout 230 by approximately 90 degrees and is directed towards the center point C of the baseplate 200, although other angles and directions may be considered as well. As will be discussed in further detail below, the circumferential cutouts 230 are configured to receive portions of the insert 400 to prevent relative rotation between the baseplate 200 and the housing 300.

Referring additionally to FIG. 4, the housing 300 may house various mechanical and electrical components of a locking system 10, for example a printed circuit board (PCB), one or more batteries, an electronic key reader, one or more lights, a speaker, etc. The housing 300 may house various means of input or output such as a radio-frequency transceiver or a Bluetooth™ module. Housing 300 may be used to house other components to be mounted to various surfaces as well. Alternatively, an additional housing (not shown) may be provided to house such components and attach to the housing 300 through various attachment means. On a first or front side, the housing 300 includes a slot 310, illustratively having at least one post 312 disposed therein for receiving and securing the insert 400, as will be discussed in further detail below. As such, the slot 310 is sized and shaped to snugly receive the insert 400 such that the insert 400 may be held within the slot 310 in a secure and non-rotatable fashion. As such, the shape and size of the slot 310 will depend on the shape and size of the insert 400. The housing 300 further includes a plurality of extrusions 320 for securing the housing 300 to the baseplate 200. As shown in FIGS. 6A-6C, the extrusions 320 are insertable into the one or more circumferential track(s) 220 in the baseplate 200 and are engageable with the engagement feature(s) 222 to attach the housing 300 to the baseplate 200. Illustratively, the extrusions 320 include a flat upper surface 322 and a narrower connecting member (not shown) connecting the flat upper surface 322 to the housing 300. As such, for such attachment, the extrusions 320 may be inserted into the circumferential track(s) 220 at a wider point therein where the lip-like engagement feature(s) 222 is/are not present. In addition, in the shown embodiment, the two extrusions 320 are diametrically opposed about a center of the housing 300 to ensure secure attachment with the baseplate 200. As the housing 300 is rotated relative to the baseplate 200 (see FIG. 6B), the flat upper surfaces 322 of the extrusions 320 rotate over the engagement feature(s) 222, thus preventing the housing 300 from being withdrawn from the baseplate 200 in a direction normal to the mounting surface, illustratively along the X axis.

In various embodiments, the engagement feature(s) 222 may take different forms to keep the extrusions 320 within the circumferential track(s) 220 once the extrusions engage with the engagement feature(s) 222, thus attaching the housing 300 to the baseplate 200 and preventing any movement between the housing 300 and the baseplate 200 along the X axis. While FIG. 3 shows two engagement features 222 as thin, lip-like structures following inner edges of the two circumferential tracks 220 along part of their arcs, other structural elements within the circumferential tracks 220 may be provided to hold the extrusions 320 in place once they are rotated sufficiently to engage with the engagement features 222. For instance, the engagement feature(s) 222 may include a narrower section of the circumferential tracks 220. Other engagement feature(s) 222 configured to attach the housing 300 to the baseplate 200 by preventing movement between the housing 300 and the baseplate once the extrusions 320 engage with the engagement feature(s) 222 may be considered as well.

Referring additionally to FIG. 5, insert 400 is shown for preventing relative rotation between the baseplate 200 and the housing 300. The insert 400 includes a slender frame 410 illustratively having a non-regular octagonal or clover-like shape, although other shapes may be considered as well, such as square or hexagonal. In the shown embodiment, the slot 310 in the housing 300 is shaped to snugly receive the insert 400 in a non-rotatable fashion, illustratively having a similar non-regular octagonal shape. Other possible shapes for the insert 400 and slot 310, such as square or hexagonal, would provide such a non-rotatable connection. In the shown embodiment, the insert 400 includes one or more cutout(s) 412 disposed about the frame 410, illustratively four circular cutouts 412 that are sized to snugly receive four posts 312 in the housing. As shown in FIG. 6A, to place the insert 400 into the housing 300, the cutouts 412 are aligned with the posts 312 and the insert 400 is inserted into the slot 310, where it is held in place by the inner walls of the slot 310 and the posts 312. As such, the number and shape of cutouts 412 should correspond to the number and shape of posts 312. In other embodiments, the insert 400 may include posts or other like protrusions insertable into recesses or other corresponding female structures within the slot 310 to secure the insert 400 in the housing 300. In further embodiments, the slot 310 may be shaped such that the insert 400 may be snap-fitted into the slot 310 for secure attachment of the insert 400 with the housing 300. In various embodiments, such a snap-fitting connection between the insert 400 and the slot 310 may supplement the connection between posts 312 and cutouts 412 or negate them.

The insert 400 further includes a plurality of protrusions 430 disposed about the frame 410, illustratively four parallelogram-shaped protrusions 430. Other numbers and shapes of protrusions 430, such as square or rectangular, may be considered as well, and the number of protrusions 430 preferably corresponds to the number of circumferential cutouts 230 in the baseplate. The protrusions 430 are insertable into the circumferential cutouts 230 at their ends opposite the catch portion 232, as shown in FIG. 6B. In the embodiment shown in FIG. 6B wherein the circumferential cutouts 230 are tapered, the protrusions 430 are insertable into the circumferential cutouts 230 at their wider ends. In this position, the width of a given circumferential cutout 230 exceeds the width of the protrusion 430 to facilitate alignment, although other configurations may be considered. In the shown embodiment, the width of the circumferential cutouts 230 gradually lessen in a tapered fashion, as will be discussed in further detail below.

The protrusions 430 are slideable along corresponding circumferential cutouts 230 until they reach a distal end thereof and fall or drop into a corresponding catch portion 232, as shown in FIG. 6C. The circumferential cutouts 230 each include an inner edge 230a and an outer edge 230b. The inner edge 230a acts as a riding surface that the protrusions 430 slide along towards the catch portions 232. As the protrusions 430 slide towards the catch portions 232, the force applied by the inner edge 230a creates a load against the protrusions 430 which is transferred to the insert 400, thus deflecting the insert 400 upon rotation and creating a torque load at the protrusions 430. Forces acting through the rotation of the housing 300 relative to the baseplate 200 act on the protrusions 430, causing the insert 400 to deflect or flex. Through this deflection or flexion of the insert 400, mechanical energy is stored in the insert 400. This stored energy is then released as the protrusions 430 near their corresponding catch portions 232, as the insert 400 may de-flex or release this stored energy causing the protrusions 430 enter the catch portions 232, thereby locking the insert 400 in place. In the shown embodiment, the tapering of each circumferential cutout 230 occurs due to the inner edge 230a of each circumferential cutout 230 gradually narrowing or tapering towards the outer edge 230b in the direction of the catch portion, causing the width of each circumferential cutout 230 to lessen as it approaches the catch portions 232. The abrupt change in angle of each catch portion 232 relative to the rest of the circumferential cutout 230 prevents a corresponding protrusion 430 from slideably reversing its path once the catch portion 232 is reached.

Referring to FIGS. 6A-6C, an exemplary process for assembling the attachment system 100 is shown. The following steps are exemplary in nature and may be modified without departing from the scope of the present disclosure. As shown in FIG. 6A, the insert 400 is inserted into the housing 300 by aligning the cutouts 412 with corresponding posts 312 so that the slot 310 may snugly receive the insert 400. Then, as shown in FIG. 6B, the housing 300 is attached to the baseplate 200 by inserting the extrusions 320 into the circumferential track(s) 220 and the protrusions 430 in the circumferential cutouts 230, as discussed above.

As shown in FIG. 6B-6C, the housing 300 is rotated relative to the baseplate 200, causing the extrusions 320 to rotate within the circumferential track(s) 220. As the housing 300 rotates relative to the baseplate 200, the flat upper surface of the extrusions 320 engage with the engagement feature(s) 222 to prevent any movement between the housing 300 and the baseplate 200 along the X axis. In the embodiment shown in FIG. 6C, the flat upper surface 322 of each extrusion 320 partially rests against the lip-like engagement feature(s) 222 to block the housing's 300 removal from the baseplate 200. The housing 300 would then only be removable from the baseplate 200 if the extrusions 320 were rotated to positions in the circumferential track(s) 220 where the engagement feature(s) 222 are not present. Further, the rotation of the housing 300 relative to the baseplate 200 causes the protrusions 430 to slideably rotate along the circumferential cutouts 230 until they reach and fall or drop into the catch portions 232, as discussed above, thus preventing relative rotation between the baseplate 200 and the housing 300. Once the protrusions 430 are positioned in corresponding catch portions 232, any attempts to rotate the housing 300 relative to the baseplate 200 would cause the protrusions 430 to abut the sides of the catch portions 230 rather than slide along the circumferential cutout 230.

In addition, the rotation of the housing relative to the baseplate 200 causes the frame 410 of the insert 400 to deflect, thus creating a torque load at the points of contact between the insert 400 and the base plate 200, illustratively at the four protrusions 430. This distributed torque load provides the attachment system 100 with added strength while increasing the necessary input required to displace the protrusions 430 out of the catch portions 230 to re-allow relative rotation between the baseplate 200 and the housing 300, for example to access components inside the housing 300 for maintenance purposes. This distributed torque load also provides a degree of redundancy in the overall design of the attachment system 100. The nature of the deflected insert 400 may provide additional security against forced vibrations. In an embodiment, as the protrusions 430 drop or fall into corresponding catch portions 232, an audible sound such as a click may be heard, alerting a user that the attachment system 100 has been correctly installed.

In various alternate embodiments, the attachment system 100 for mounting a component of a locking device to a mounting surface may be provided without the insert 400 so that the housing 300 may rotate relative to the baseplate 200 within the circumferential track(s) 220 once attached. For instance, such a configuration may be suitable for locking devices 10 whereby a certain degree of rotation is needed, for example to impart translational movement to a bolt in a deadbolt locking system. In such cases, the permissible rotation of the housing 300 relative to the baseplate may be dictated by the dimensions of the circumferential track(s) 220. In some embodiments, the attachment system 100 may be configured to function both with or without the insert 400, providing a multi-use attachment system 100 that may, for instance, be adapted for various types of locking devices 10. In such embodiments, the housing 300 may include the above-described slot 310 and the baseplate 200 may include the above-described circumferential cutouts 230 so that the insert 400 may be implemented or not at will without requiring any further modification to the attachment system 100. Such an attachment system 100 may thus be easily adapted for different applications, for instance to mount components of various types of locking devices.

Referring now to FIGS. 7A-7B, 8A-8B and 9, in an embodiment the housing 300 includes on a second or rear side a slot or compartment 330 configured to receive a replaceable battery cassette 500. Such a battery cassette 500 may, in various embodiments, include one or more batteries to be used to power a locking system as shown in FIG. 1. As shown, the replaceable battery cassette 500 is insertable in the cassette slot 330 in the second or rear side of the housing 300. The battery cassette 500 includes one or more battery slots 510, each shown having a positive terminal 512, a negative terminal 514 and a biasing spring 516 to receive, for instance, a 9V battery, and an interlocking feature 520 configured to removably lock the battery cassette 500 to the housing 300. In an embodiment, the interlocking feature 520 includes a release button 522 and one or more spring-activated pins 524 configured to engage with one or more interlocking cutouts 332 in the cassette slot 330. In use, the battery cassette 500 is insertable in the cassette slot 330 by aligning the pin(s) 524 in the cutout(s) 332 and releasable from the cassette slot 330 by pushing the release button 522 to displace the pin(s) from the cutout(s) 332. In other embodiments, the release button may be replaced by other means of activating the spring-activated pin(s) 524. As such, the battery cassette 500 is easily releasable from the housing 300, for example to replace the batteries inside the battery cassette 500 or to service its various components.

Figure 10:
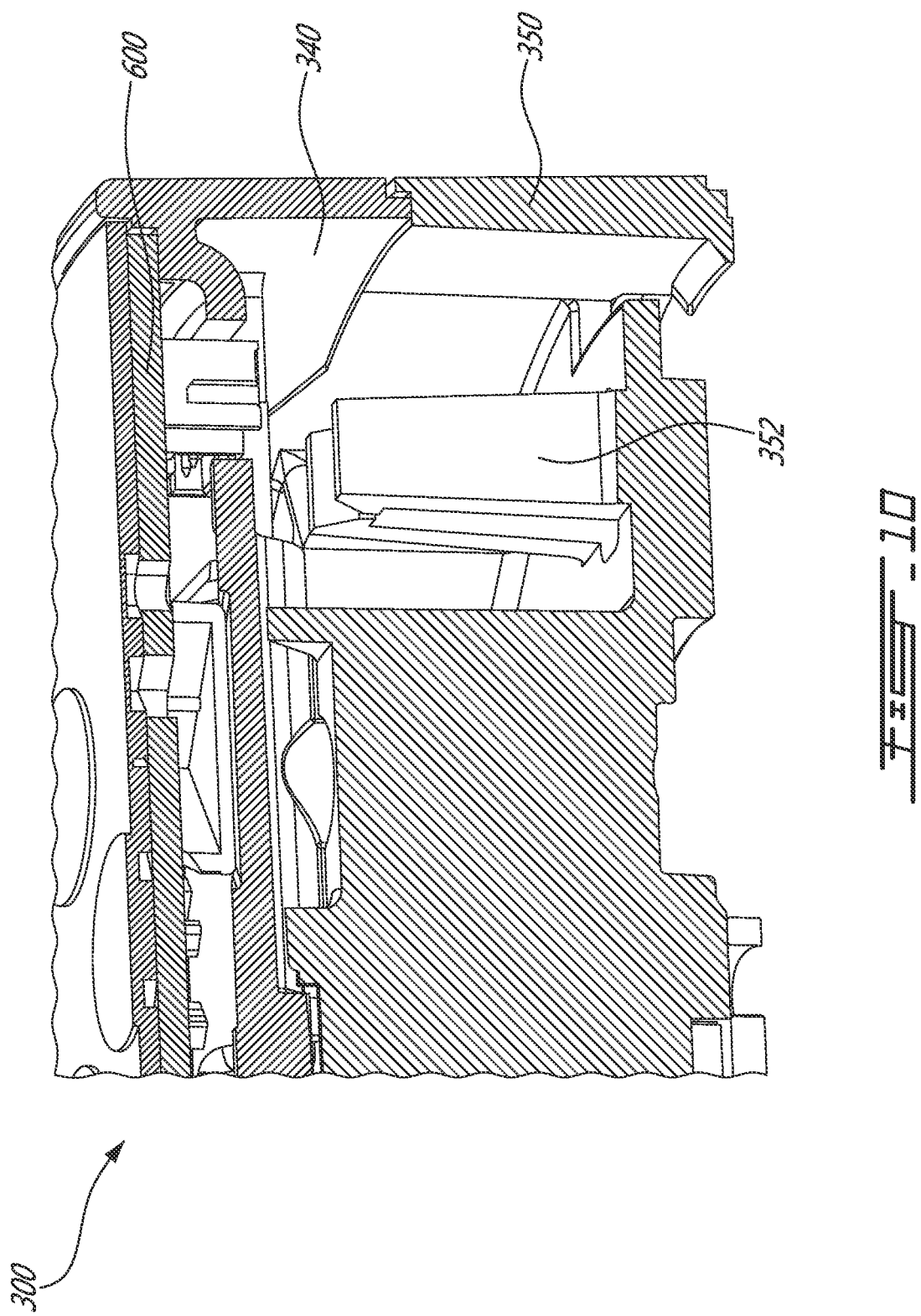
FIG. 10 is a partial cross-sectional view of the housing of FIG. 4 having an optional printed circuit board.
Figure 11:
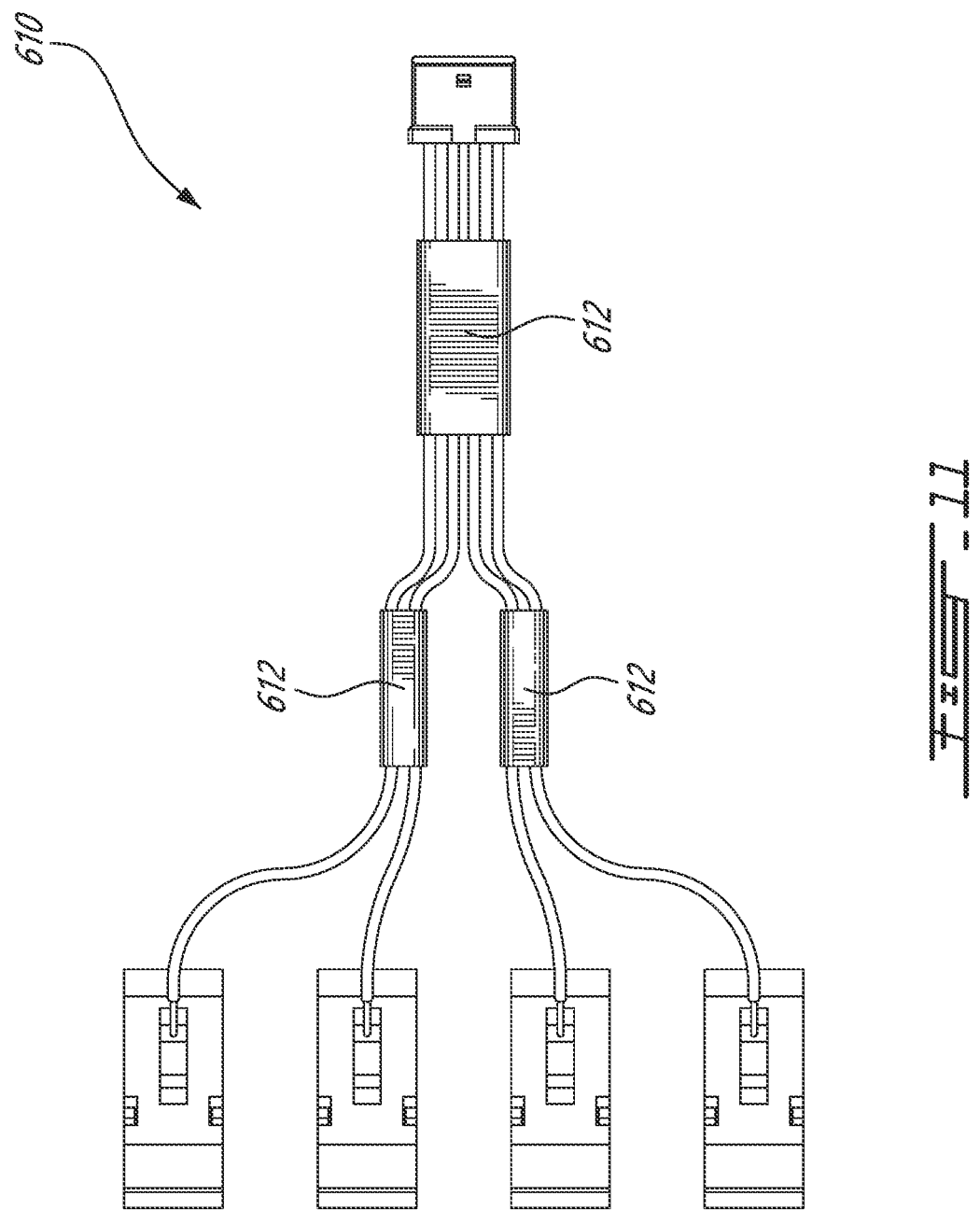
FIG. 11 is a top view of a cable arrangement for the printed circuit board of FIG. 10.

Referring to FIGS. 10 and 11, in various embodiments the housing 300 houses various electronics such as a printed circuit board (PCB) 600. In other embodiments, the additional housing described above (not shown) may be provided to house various electronics such as the PCB 600 and attach to the housing 300 through various attachment means. PCB 600 may be powered by a power source such as batteries housed in battery cassette 500. In other embodiments, PCB 600 may be powered by an external power supply, as will be discussed in further detail below. The PCB 600 may, for instance, control a locking system as in FIG. 1. A plurality of cables 610 connects the PCB 600 to one or more batteries or another power source. Such cables 610 may include a variety of pinch prevention features to prevent potential damage to the cables 610. One or more cable holders 612 may hold the cables 610 together to reinforce certain regions of the cables 610 for added rigidity while offering increased flexibility in the non-reinforced region. Additionally, the housing 300 may include various subassemblies 340, 350 pressed against each other adjacent the PCB 600, which may include a cable guide 352. Alternatively, as discussed above, subassembly 340 may instead be an additional housing attached to the housing 300 and be configured to house the PCB 600 and/or other electronics. The cable guide 352 may allow the end of the cables 610 to displace vertically within the cable guide 352. This affordance, combined with the relative flexibility of the cable 610 in this region and the relative inflexibility in other areas due to the placement of the cable holders 612, prevents the cables 610 from being pinched between the subassemblies 340, 350 adjacent the PCB 600. In various embodiments, the cables 610 may be used for other purposes besides for powering the PCB 600, such as for data transmission.

In an embodiment, the PCB 600 may include connection means to an external computer or data storage device, for instance to provide software updates to the entry device 22, to change or remove one or more numerical entry code combinations enterable on the entry device's 22 keypad, or to reset the entry device's 22 functionality. In other embodiments, the PCB 600 may control a speaker housed within the housing 300 that may emit various sounds alerting a user of different events, for instance to alert the user that a correct code has been entered, that an incorrect code has been entered, that the locking system 10 has been correctly locked, that an error has occurred, or that the battery is running low (if so equipped).

Referring to FIGS. 12 and 13, in various embodiments a display frame 700 for attaching an electronic display (not shown) is attachable to the PCB 600 housed in the housing 300. The display frame 700 includes a cavity 710 for receiving the electronic display, a pair of locating posts 720 and a pair of flexing hooks 730 for attaching to the PCB 600. In such an embodiment, the PCB may include a primary opening 620 for the display frame 700, a pair of cutouts 630 for the locating posts 720 and a pair of elongated cutouts 640 to which the flexible hooks 730 may attach. Other attachment means may be provided as well. The electronic display may, for example, display a status of a locking system 100 as in FIG. 1 or display a battery level for the batteries held in the battery cassette 500. Other pertinent information sourced from the PCB or other sources may be displayed on the electronic display as well, such as combination or lock input information.

Figure 15:
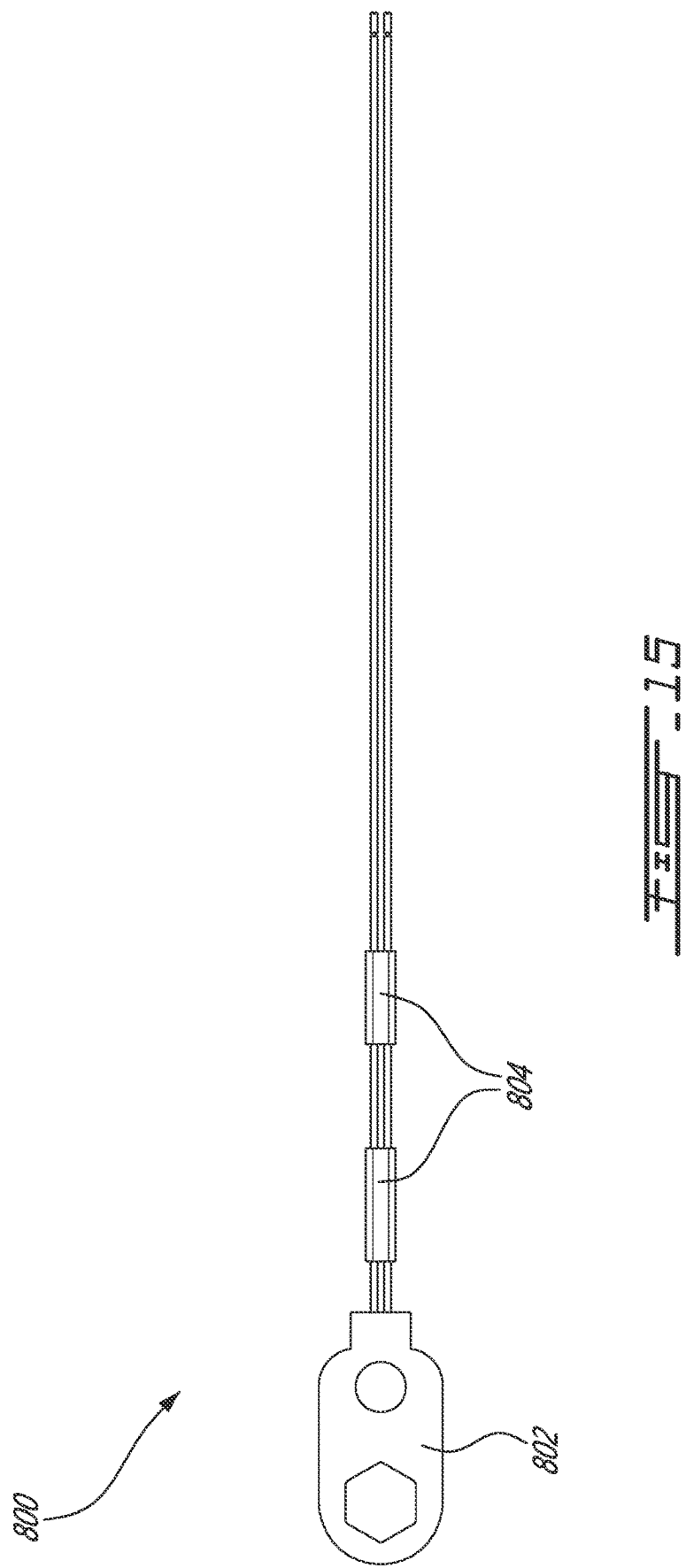
FIG. 15 is a top view of an exemplary connector cable insertable into the power compartment of FIGS. 14A and 14B.

Referring to FIGS. 14A, 14B and 15, as discussed above the PCB 600 or other electronic components housed within the housing 300 may receive power from a battery or from an external power source, illustratively by a 9V power cable 800. In such embodiments, the rear or second side of the housing 300 may include a power compartment 360 with a self-ejecting pivoting hatch 362 which houses a connector 802 for the power cable 800. To eject the connector 802, the pivoting hatch 362 is moved partially through its range of motion, as shown in FIG. 14B, drawing the connector 802 out of the power compartment 360. The power cable 800 may include various features 804 along its length that assist it in being ejected from the power compartment 360. In the shown embodiment, these features 804 may include cable holders.

As can be seen therefore, the examples described above and illustrated are intended to be exemplary only. The scope is indicated by the appended claims.

What is claimed is:

1. An attachment system for a locking device mounted to a closure, the attachment system comprising:
   a baseplate fastenable to a mounting surface of the closure, the baseplate including at least one circumferential track having an engagement feature, and a plurality of circumferential cutouts terminating with a catch portion;
   a housing including a plurality of extrusions insertable into the at least one circumferential track in the baseplate and engageable with the engagement feature to prevent the housing from being withdrawn from the baseplate in a direction normal to the mounting surface, the housing further including a slot and a battery cassette slot configured to receive a replaceable battery cassette, wherein the replaceable battery cassette is fastenable to the housing via at least one spring-activated pin insertable in at least one cutout in the battery cassette slot; and
   an insert securely insertable into the slot in the housing, the insert including a frame having a plurality of protrusions insertable into the plurality of circumferential cutouts in the baseplate;
   wherein the plurality of protrusions are slideably lockable in the catch portions of the plurality of circumferential cutouts to prevent relative rotation between the baseplate and the housing.

2. The attachment system as defined in claim 1, wherein each of the plurality of circumferential cutouts in the baseplate includes an inner edge and an outer edge, and further wherein each of the plurality of protrusions is slideable along a corresponding inner edge to deflect the insert and create a torque load at each of the plurality of protrusions.

3. The attachment system as defined in claim 2, wherein, in each of the plurality of circumferential cutouts, the inner edge tapers towards the outer edge as the circumferential cutout approaches the catch portion.

4. The attachment system as defined in claim 1, wherein the housing is configured to house a printed circuit board.

5. The attachment system as defined in claim 1, wherein the insert includes four protrusions insertable into four circumferential cutouts in the baseplate.

6. The attachment system as defined in claim 1, wherein the slot in the housing includes at least one post disposed therein and the frame of the insert includes at least one cutout, the at least one post insertable into the at least one cutout upon inserting the insert into the slot to secure the insert to the housing.

7. A method for assembling an attachment system for a locking device, comprising:
   inserting an insert into a housing, wherein the insert is received in a non-rotatable fashion in a mating seat defined in the housing;
   engaging a plurality of extrusions projecting from an inner surface of the housing with at least one circumferential track of a baseplate to mount the housing to the baseplate;
   engaging a plurality of protrusions projecting from the insert into a plurality of circumferential cutouts terminating with a catch portion in the baseplate;
   inserting a battery cassette into a battery cassette compartment in the housing, wherein the battery cassette is fastenable to the housing via at least one spring-activated pin insertable in at least one cutout in the battery cassette compartment; and
   rotating the housing relative to the baseplate to slideably lock the plurality of protrusions in the catch portions of the plurality of circumferential cutouts.

8. The method as defined in claim 7, further comprising mounting the baseplate to a mounting surface of a closure.

9. The method as defined in claim 8, wherein mounting the baseplate to a mounting surface further includes mounting the baseplate to a safe.

10. The method as defined in claim 7, wherein rotating the housing relative to the baseplate further includes deflecting the insert to create a torque load at the plurality of protrusions by sliding each of the plurality of protrusions along an inner edge of a corresponding one of the plurality of circumferential cutouts.

* * * * *